(12) United States Patent
Yokota

(10) Patent No.: US 7,406,665 B2
(45) Date of Patent: Jul. 29, 2008

(54) DISPLAY METHOD AND APPARATUS FOR NAVIGATION SYSTEM

(75) Inventor: Tatsuo Yokota, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 618 days.

(21) Appl. No.: 10/716,908

(22) Filed: Nov. 19, 2003

(65) Prior Publication Data

US 2005/0107949 A1 May 19, 2005

(51) Int. Cl.
*G06F 3/048* (2006.01)

(52) U.S. Cl. .................. 715/826; 701/202; 701/209; 701/210; 701/211

(58) Field of Classification Search ............... 715/810; 701/200, 201–211
See application file for complete search history.

(56) References Cited

U.S. PATENT DOCUMENTS

| | | | |
|---|---|---|---|
| 5,559,707 A * | 9/1996 | DeLorme et al. | 701/200 |
| 5,802,492 A * | 9/1998 | DeLorme et al. | 455/456.5 |
| 5,987,375 A * | 11/1999 | Tamai | 701/200 |
| 6,097,316 A * | 8/2000 | Liaw et al. | 340/988 |
| 6,119,095 A | 9/2000 | Morita | |
| 6,321,158 B1 * | 11/2001 | DeLorme et al. | 701/201 |
| 6,347,280 B1 * | 2/2002 | Inoue et al. | 701/211 |
| 6,349,257 B1 * | 2/2002 | Liu et al. | 701/200 |
| 6,397,211 B1 * | 5/2002 | Cooper | 707/3 |
| 6,768,942 B1 * | 7/2004 | Chojnacki | 701/200 |
| 6,873,905 B2 * | 3/2005 | Endo et al. | 701/202 |
| 6,873,907 B1 * | 3/2005 | Millington et al. | 701/209 |
| 6,978,208 B2 * | 12/2005 | Endo et al. | 701/202 |
| 7,092,935 B2 * | 8/2006 | Yourlo et al. | 707/3 |
| 7,099,773 B2 * | 8/2006 | Linn | 701/210 |
| 7,233,862 B2 * | 6/2007 | Endo et al. | 701/209 |
| 2002/0010542 A1 * | 1/2002 | Ahrens et al. | 701/200 |
| 2003/0191578 A1 * | 10/2003 | Paulauskas et al. | 701/200 |
| 2005/0255861 A1 * | 11/2005 | Wilson et al. | 455/456.2 |

FOREIGN PATENT DOCUMENTS

JP 2002-039761 2/2002

* cited by examiner

*Primary Examiner*—Weilun Lo
*Assistant Examiner*—Eric A Wiener
(74) *Attorney, Agent, or Firm*—Muramatsu & Associates

(57) ABSTRACT

A display method and apparatus for a navigation system which is capable of easily and quickly specifying a destination in the navigation system when using a "Point of Interest (POI)" method by preventing unwanted POI names or types from appearing on the navigation system. The method includes the steps of displaying a POI name list based on an instruction specified by a user, selecting an unwanted POI name in the POI name list, removing all POIs having the unwanted POI name or having the unwanted POI type from the POI name list, and selecting a destination in the POI name list from which the unwanted POI name is removed for route guidance by the navigation system. If necessary, the above steps of selecting the unwanted POI name and removing the unwanted POI names from the POI name list are repeated.

28 Claims, 25 Drawing Sheets

Fig. 4A

| Dest | Find Destination By | |
|---|---|---|
| | Address | Intersection |
| | Point of Interest | |
| | Phone Number | |
| | Latitude / Longitude | |
| | Previous Destinations | |
| | Address Book | |
| | Today's Plan | 5 |

Fig. 4B  Enter ↓ ↑ Cancel

| Dest | Find Point of Interest By |
|---|---|
| | Place Name |
| | Place Type |

Fig. 4C  Enter ↓ ↑ Cancel

| Dest | Select Category |
|---|---|
| | ATM |
| | AUTOMOTIVE |
| | BANK |
| | EMERGENCY |
| | GAS STATION |
| | RESTAURANT |

Fig. 4D  Enter ↓ ↑ Cancel

| Dest | Find Place By |
|---|---|
| | Sort by Distance |
| | Name |
| | Within a City |

Fig. 5A  Enter ↓  ↑ Cancel

| Dest | Select Name |
|---|---|
| | 1228 Main St. Torrance CA (310) 555-6789 |
| | Claim Jumper |
| | McDonalds |
| | Pizza Hut |
| | Burger King |

Fig. 5B

Page 1
- Claim Jumper
- McDonalds
- Pizza Hut
- Burger King

Page 2
- McDonalds
- El Torito
- Royal Place Seafood
- Pizza Hut

Page 3
- Boston Market
- Taco Bell
- Domino Pizza
- McDonalds

Page 4
- Carl's Jr.
- Subway
- Denny's
- Cheesecake Factory

Page 5
- McDonalds
- Burger King
- Pizza Hut
- Romano's Macaroni Grill

Page 6
- Mimi's Cafe
- —

Fig. 6A

Fig. 7A

Fig. 6B

Page 1
- Claim Jumper
- McDonalds
- Pizza Hut
- Burger King

Page 2
- McDonalds
- El Torito
- Royal Place Seafood
- Pizza Hut

Page 3
- Boston Market
- Taco Bell
- Domino Pizza
- McDonalds

Page 4
- Carl's Jr.
- Subway
- Denny's
- Cheesecake Factory

Page 5
- McDonalds
- Burger King
- Pizza Hut
- Romano's Macaroni Grill

Page 6
- Mimi's Cafe
- ---

Fig. 7B

Page 1
- Claim Jumper
- (McDonalds)
- Pizza Hut
- Burger King
- (McDonalds)
- El Torito Page 2
- Royal Place Seafood
- Pizza Hut
- Boston Market
- Taco Bell Page 3
- Domino Pizza
- (McDonalds)
- Carl's Jr.
- Subway
- Denny's Page 4
- Cheesecake Factory
- (McDonalds)
- Burger King
- Pizza Hut
- Romano's Macaroni Grill Page 5
- Mimi's Cafe
- ---

Fig. 8A
Fig. 8B
Fig. 9A
Fig. 9B

Fig. 10A

| Dest | Select Name |
|---|---|
| 7777 Adams St. Torrance CA (310) 123-4567 | |
| Denny's | |
| Cheesecake Factory | |
| Romano's Macaroni Grill | |
| Mimi's Cafe | |

Scroll →

↓ Enter ↑ Cancel

Fig. 10B

| Dest | Confirm Route |
|---|---|
| Mimi's Cafe 7777 Adams St. Torrance CA (310) 123-4567 | |
| By Quickest Route Method | |
| OK to Proceed | |
| Options | |

↓ Enter

Calculating

Fig. 10D

NEXT TURN: ← 2.8 MI
Adams Str.

1/8mi   VP   NP

TO        3 MI       0:05 TO GO
ON: Carson, Torrance

Fig. 11A

| Dest | Find Destination By |
|---|---|
| | Address / Intersection |
| | Point of Interest |
| | Phone Number |
| | Latitude / Longitude |
| | Previous Destinations |
| | Address Book |
| | Today's Plan  5 |

↓ Enter   ↑ Cancel

Fig. 11B

| Dest | Find Point of Interest By |
|---|---|
| | Place Name |
| | Place Type |

↓ Enter   ↑ Cancel

Fig. 11C

| Dest | Input Name |
|---|---|

_

| A B C D E F G H I J | Delete |
|---|---|
| K L M N O P Q R S T | |
| U V W X Y Z & ' / - | Space |
| 1 2 3 4 5 6 7 8 9 0 | |

↓ Enter   ↑ Cancel

Fig. 11D

| Dest | Input Name |
|---|---|

MA

| A B C D E F G H I J | Delete |
|---|---|
| K L M N O P Q R S T | |
| U V W X Y Z & ' / - | Space |
| 1 2 3 4 5 6 7 8 9 0 | |

Maaco Auto Painting
MacAuther Book Store
Macy's

↓ Enter   ↑ Cancel

Fig. 12A

| Dest | Select Name | Remove | ▷ |

34567 Harber St.
Costa Mesa CA
(714) 123-0000

| Maaco Auto Painting |
| MacAuther Book Store |
| ▓ Macy's ▓ |
| Macy's |

→ Right

Fig. 13A

| Dest | Select Name | Remove | ▷ |

11111 Mission St.
Costa Mesa CA
(714) 321-9999

| Maaco Auto Painting |
| MacAuther Book Store |
| Mahan Electric |
| ▓ Mail Boxes Etc ▓ |

→ Right

Fig. 12B

Page 1
- Maaco Auto Painting
- MacAuther Book Store
- Macy's
- Macy's

Page 2
- Macy's
- Mahan Electric
- Mail Boxes Etc
- Mail Boxes Etc

Page 3
- Mail boxes Etc
- Mail Boxes Etc
- Maley's Window Product
- Manpower professional Page 4
- Mario Toys
- Marriott Hotel
- Marukai Food Market

Fig. 13B

Page 1
- Maaco Auto Painting
- MacAuther Book Store
- (Macy's)
- (Macy's)
- (Macy's)
- Mahan Electric
- Mail Boxes Etc Page 2
- Mail Boxes Etc
- Mail boxes Etc
- Mail Boxes Etc
- Maley's Window Product Page 3
- Manpower professional
- Mario Toys
- Marriott Hotel
- Marukai Food Market

Fig. 14A

| Dest | Select Name | Remove ▷ |
|---|---|---|
| 33333 Harber St. Costa Mesa CA (714) 000-7654 | | |
| Maaco Auto Painting | | |
| MacAuther Book Store | | |
| Mahan Electric | | |
| Maley's Window Product | | |

Right →  Scroll →

Fig. 15A

| Dest | Select Name | Remove ▷ |
|---|---|---|
| 12345 State St. Costa Mesa CA (714) 000-3456 | | |
| Maley's Window Product | | |
| Manpower Professional | | |
| Mario Toys | | |
| Marriott Hotel | | |

Fig. 14B

Page 1:
- Maaco Auto Painting
- MacAuther Book Store
- (Macy's)
- (Macy's)
- (Macy's)
- Mahan Electric
- (Mail Boxes Etc)
- (Mail Boxes Etc)
- (Mail boxes Etc)
- (Mail Boxes Etc)
- Maley's Window Product Page 2:
- Manpower professional
- Mario Toys
- Marriott Hotel
- Marukai Food Market

Fig. 15B

Page 1:
- Maaco Auto Painting
- MacAuther Book Store
- (Macy's)
- (Macy's)
- (Macy's)
- Mahan Electric
- (Mail Boxes Etc)
- (Mail Boxes Etc)
- (Mail boxes Etc)
- (Mail Boxes Etc)
- Maley's Window Product Page 2:
- Manpower professional
- Mario Toys
- Marriott Hotel
- Marukai Food Market

Fig. 16A

| Dest | Select Name | |
|---|---|---|
| ◁ Remove Same Type | 1234 Main St.<br>Torrance CA<br>(310) 555-9876 | ▷ Remove Selected Name |
| | Claim Jumper | |
| | McDonalds | |
| | Pizza Hut | |
| | Burger King | |

Fig. 16C

| Dest | Select Name | |
|---|---|---|
| ◁ Remove Same Type | 2000 Maple Ave<br>Torrance CA<br>(310) 123-0000 | ▷ Remove Selected Name |
| | Claim Jumper | |
| | McDonalds | |
| | Burger King | |
| | El Torito | |

Fig. 16B

Claim Jumper
(McDonalds)
Pizza Hut
Burger King
(McDonalds)
El Torito
Royal Place Seafood
Pizza Hut
Boston Market
Taco Bell
Domino Pizza
(McDonalds)
Carl's Jr.
Subway
Denny's
Cheesecake Factory
(McDonalds)
Burger King
Pizza Hut
Romano's Macaroni Grill
Mimi's Cafe
---

Fig. 16D

Claim Jumper
(McDonalds)
(Pizza Hut)
(Burger King)
(McDonalds)
El Torito
Royal Place Seafood
(Pizza Hut)
Boston Market
(Taco Bell)
(Domino Pizza)
(McDonalds)
(Carl's Jr.)
(Subway)
Denny's
Cheesecake Factory
(McDonalds)
(Burger King)
(Pizza Hut)
Romano's Macaroni Grill
Mimi's Cafe
---

Fig. 17A

```
┌─────────────────┐
│ Burger King     │ ─ Screen
│ El Torito       │
│ MacDonald's     │
│ Pizza Hut       │
├─────────────────┤
│ Burger King     │
│ Taco Bell       │
│ Subway          │
│ MacDonald's     │
│ Domino's Pizza  │
│ Shanghai Delight│
│ MacDonald's     │
│ KFC             │
│ Olive Garden    │
│ Subway          │
│ Pizza Hut       │
│ El Pollo Loco   │
│ Burger King     │
│ In-N-Out Burger │
│ MacDonald's     │
│ Denny's         │
│ Burger King     │
│ Pizza Hut       │
│ Mimi's Cafe     │
│ Fat Burger      │
│ MacDonald's     │
│ El Pollo Loco   │
│ MacDonald's     │
│ Jack in the Box │
│ KFC             │
│ Acapulco        │
│ Burger King     │
│ Round Table Pizza│
└─────────────────┘
```

Fig. 17B

Remove ▷

```
┌─────────────────┐
│ (Burger King)   │ ─ Screen
│ El Torito       │
│ MacDonald's     │
│ Pizza Hut       │
├─────────────────┤
│ (Burger King)   │
│ Taco Bell       │
│ Subway          │
│ MacDonald's     │
│ Domino's Pizza  │
│ Shanghai Delight│
│ MacDonald's     │
│ KFC             │
│ Olive Garden    │
│ Subway          │
│ Pizza Hut       │
│ El Pollo Loco   │
│ (Burger King)   │
│ In-N-Out Burger │
│ MacDonald's     │
│ Denny's         │
│ (Burger King)   │
│ Pizza Hut       │
│ Mimi's Cafe     │
│ Fat Burger      │
│ MacDonald's     │
│ El Pollo Loco   │
│ MacDonald's     │
│ Jack in the Box │
│ KFC             │
│ Acapulco        │
│ (Burger King)   │
│ Round Table Pizza│
└─────────────────┘
```

Fig. 18A

| El Torito | |
|---|---|
| MacDonald's | |
| Pizza Hut | |
| Taco Bell | |

— Screen

Subway
MacDonald's
Domino's Pizza
Shanghai Delight
MacDonald's
KFC
Olive Garden
Subway
Pizza Hut
El Pollo Loco
In-N-Out Burger
MacDonald's
Denny's
Pizza Hut
Mimi's Cafe
Fat Burger
MacDonald's
El Pollo Loco
MacDonald's
Jack in the Box
KFC
Acapulco
Round Table Pizza

Fig. 18B

Remove ▷

| El Torito | |
|---|---|
| MacDonald's | |
| (Pizza Hut) | |
| Taco Bell | |

— Screen

Subway
MacDonald's
Domino's Pizza
Shanghai Delight
MacDonald's
KFC
Olive Garden
Subway
(Pizza Hut)
El Pollo Loco
In-N-Out Burger
MacDonald's
Denny's
(Pizza Hut)
Mimi's Cafe
Fat Burger
MacDonald's
El Pollo Loco
MacDonald's
Jack in the Box
KFC
Acapulco
Round Table Pizza

Fig. 19A

| El Torito |
|---|
| MacDonald's |
| Taco Bell |
| Subway |

Screen

MacDonald's
Domino's Pizza
Shanghai Delight
MacDonald's
KFC
Olive Garden
Subway
El Pollo Loco
In-N-Out Burger
MacDonald's
Denny's
Mimi's Cafe
Fat Burger
MacDonald's
El Pollo Loco
MacDonald's
Jack in the Box
KFC
Acapulco
Round Table Pizza

Fig. 19B

Remove ▷

| El Torito |
|---|
| (MacDonald's) |
| Taco Bell |
| Subway |

Screen (MacDonald's)
Domino's Pizza
Shanghai Delight
(MacDonald's)
KFC
Olive Garden
Subway
El Pollo Loco
In-N-Out Burger
(MacDonald's)
Denny's
Mimi's Cafe
Fat Burger
(MacDonald's)
El Pollo Loco
(MacDonald's)
Jack in the Box
KFC
Acapulco
Round Table Pizza

Fig. 20

| El Torito |
|---|
| Taco Bell |
| Subway |
| Domino's Pizza |
| Shanghai Delight |
| KFC |
| Olive Garden |
| Subway |
| El Pollo Loco |
| In-N-Out Burger |
| Denny's |
| Mimi's Cafe |
| Fat Burger |
| El Pollo Loco |
| Jack in the Box |
| KFC |
| Acapulco |
| Round Table Pizza |

— Screen

Fig. 21

| El Torito |
|---|
| Taco Bell |
| Subway |
| Domino's Pizza |
| Shanghai Delight |
| KFC |
| Olive Garden |
| Subway |
| El Pollo Loco |
| In-N-Out Burger |
| Denny's |
| Mimi's Cafe |
| Fat Burger |
| El Pollo Loco |
| Jack in the Box |
| KFC |
| Acapulco |
| Round Table Pizza |
| *Subway* |
| *Domino's Pizza* |
| *Arby's* |
| *Del Taco* |
| *Regal Palace* |
| *In-N-Out Burger* |
| *KFC* |
| *Panda Express* |
| *Subway* |
| *El Pollo Loco* |
| *Daphne's* |
| *Carl's Jr.* |
| *Domino's Pizza* |

— Screen

New Entries (bracket spans from *Subway* to *Domino's Pizza*)

Fig. 23A

| Dest | Find Destination By |
|---|---|
| | Address \| Intersection |
| | Point of Interest |
| | Phone Number |
| | Latitude / Longitude |
| | Previous Destinations |
| | Address Book |
| | Today's Plan          5 |

Fig. 23B  Enter | Cancel

| Dest | Find Point of Interest By |
|---|---|
| | Select Place Type |
| | Input Place Name |
| | Input City Name |

Fig. 23C  Enter | Cancel

| Dest | Input Place Name |
|---|---|

PACIF_

| A | B | C | D | E | F | G | H | I | J | More |
|---|---|---|---|---|---|---|---|---|---|---|
| K | L | M | N | O | P | Q | R | S | T | Delete |
| U | V | W | X | Y | Z | & | ' | / | - | Space |
| 1 | 2 | 3 | 4 | 5 | 6 | 7 | 8 | 9 | 0 | List |

PACIFIC
PACIFIC ACRES

Fig. 23D  ↓Enter  ↑Cancel

| Dest | Select Place Name |
|---|---|

◁ Remove Type | Type: Chinese (Restaurant)<br>Name: PACIF<br>Address: 123 Main St, Irvine, CA | Remove Chain ▷
| Pacific |
| Pacific Acres |
| Pacific Acres Motor Sales |
| Pacific Age Cafe |

Fig. 23E

| Dest | Select Place Name |
|---|---|

◁ Remove Type | Address: 8 locations by this name<br>Select, Sort By:<br>Distance \| Type | Remove Chain ▷
| Pacific |
| Pacific Acres |
| Pacific Acres Motor Sales |
| Pacific Age Cafe |

Fig. 23F  Enter | Cancel

| Dest | Select Type |
|---|---|

REAL E_

| A | B | C | D | E | F | G | H | I | J | More |
|---|---|---|---|---|---|---|---|---|---|---|
| K | L | M | N | O | P | Q | R | S | T | Delete |
| U | V | W | X | Y | Z | & | ' | / | - | Space |
| 1 | 2 | 3 | 4 | 5 | 6 | 7 | 8 | 9 | 0 | List |

PACIFIC ACRES
PACIFIC ACRES

Fig. 24

| Place Name | Place Type |
|---|---|
| Pacific | *Chinese (Restaurant)* |
| Pacific Acres * | *Real Estate / Campground* |
| Pacific Acres Motor Sales | *Auto Dealer* |
| Pacific Age Cafe * | *Coffee & Tea Houses* |
| Pacific Air Cargo | *Courier Service* |
| Pacific Air Cargo - Atlanta | *Courier Service* |
| Pacific Air Cargo - Boston | *Courier Service* |
| Pacific Air Cargo - Chicago | *Courier Service* |
| Pacific Air Cargo - Denver | *Courier Service* |
| Pacific Air Cargo - Los Angeles | *Courier Service* |
| Pacific Air Cargo - New York | *Courier Service* |
| Pacific Air Cargo - San Diego | *Courier Service* |
| Pacific Air Cargo - San Francisco | *Courier Service* |
| Pacific Air Cargo - Seattle | *Courier Service* |
| Pacific Air Cargo - Vancouver | *Courier Service* |
| Pacific Air Conditioned Rentals | *Rental Equipment* |
| Pacific Air Conditioner | *Air Conditioner Retail* |
| Pacific Air Conditioner & Heaters | *Air Conditioner Retail* |
| Pacific Air Conditioner Care | *Air Conditioner Service* |
| Pacific Air Conditioner Outlet | *Air Conditioner Retail* |
| Pacific Air Conditioner Repairs | *Air Conditioner Service* |
| Pacific Air Conditioner Services | *Air Conditioner Service* |
| Pacific Air Conditioning & Heating | *Air Conditioner Retail* |
| Pacific Air Conditioning Center | *Air Conditioner Service* |
| Pacific Air Conditioning Installers | *Air Conditioner Service* |
| Pacific Air Conditioning Repairs | *Air Conditioner Service* |
| Pacific Air Conditioning Sales | *Air Conditioner Retail* |
| Pacific Air Control Devices | *Precision Device Mfr.* |
| Pacific Air Controlled Mattresses | *Mattress Retail* |
| Pacific Air Medical | *Medical Equipment* |
| Pacific Air Parcel Express | *Courier Service* |
| Pacific Air Quality Control Board | *Government Agency* |
| Pacific Air Arcades | *Amusement Park* |

Screen

Fig. 25

| Place Name | Place Type |
|---|---|
| Pacific Air Cargo | Courier Service |
| Pacific Air Cargo - Atlanta | Courier Service |
| Pacific Air Cargo - Boston | Courier Service |
| Pacific Air Cargo - Chicago | Courier Service |
| Pacific Air Cargo - Denver | Courier Service |
| Pacific Air Cargo - Los Angeles | Courier Service |
| Pacific Air Cargo - New York | Courier Service |
| Pacific Air Cargo - San Diego | Courier Service |
| Pacific Air Cargo - San Francisco | Courier Service |
| Pacific Air Cargo - Seattle | Courier Service |
| Pacific Air Cargo - Vancouver | Courier Service |
| Pacific Air Conditioned Rentals | Rental Equipment |
| Pacific Air Conditioner | Air Conditioner Retail |
| Pacific Air Conditioner & Heaters | Air Conditioner Retail |
| Pacific Air Conditioner Care | Air Conditioner Service |
| Pacific Air Conditioner Outlet | Air Conditioner Retail |
| Pacific Air Conditioner Repairs | Air Conditioner Service |
| Pacific Air Conditioner Services | Air Conditioner Service |
| Pacific Air Conditioning & Heating | Air Conditioner Retail |
| Pacific Air Conditioning Center | Air Conditioner Service |
| Pacific Air Conditioning Installers | Air Conditioner Service |
| Pacific Air Conditioning Repairs | Air Conditioner Service |
| Pacific Air Conditioning Sales | Air Conditioner Retail |
| Pacific Air Control Devices | Precision Device Mfr. |
| Pacific Air Controlled Mattresses | Mattress Retail |
| Pacific Air Medical | Medical Equipment |
| Pacific Air Parcel Express | Courier Service |
| Pacific Air Quality Control Board | Government Agency |
| Pacific Air Arcades | Amusement Park |

Screen

Fig. 26

| Place Name | Place Type |
|---|---|
| Pacific Air Conditioned Rantals | *Rental Equipment* |
| Pacific Air Conditioner | *Air Conditioner Retail* |
| Pacific Air Conditioner & Heaters | *Air Conditioner Retail* |
| Pacific Air Conditioner Care | *Air Conditioner Service* |
| Pacific Air Conditioner Outlet | *Air Conditioner Retail* |
| Pacific Air Conditioner Repairs | *Air Conditioner Service* |
| Pacific Air Conditioner Services | *Air Conditioner Service* |
| Pacific Air Conditioning & Heating | *Air Conditioner Retail* |
| Pacific Air Conditioning Center | *Air Conditioner Service* |
| Pacific Air Conditioning Installers | *Air Conditioner Service* |
| Pacific Air Conditioning Repairs | *Air Conditioner Service* |
| Pacific Air Conditioning Sales | *Air Conditioner Retail* |
| Pacific Air Control Devices | *Precision Device Mfr.* |
| Pacific Air Controlled Mattresses | *Mattress Retail* |
| Pacific Air Medical | *Medical Equipment* |
| Pacific Air Quality Control Board | *Government Agency* |
| Pacific Air Arcades | *Amusement Park* |

Screen

Fig. 27

| Place Name | Place Type |
|---|---|
| Pacific Air Conditioner | Air Conditioner Retail |
| Pacific Air Conditioner & Heaters | Air Conditioner Retail |
| Pacific Air Conditioner Care | Air Conditioner Service |
| Pacific Air Conditioner Outlet | Air Conditioner Retail |
| Pacific Air Conditioner Repairs | Air Conditioner Service |
| Pacific Air Conditioner Services | Air Conditioner Service |
| Pacific Air Conditioning & Heating | Air Conditioner Retail |
| Pacific Air Conditioning Center | Air Conditioner Service |
| Pacific Air Conditioning Installers | Air Conditioner Service |
| Pacific Air Conditioning Repairs | Air Conditioner Service |
| Pacific Air Conditioning Sales | Air Conditioner Retail |
| Pacific Air Control Devices | Precision Device Mfr. |
| Pacific Air Controlled Mattresses | Mattress Retail |
| Pacific Air Medical | Medical Equipment |
| Pacific Air Quality Control Board | Government Agency |
| Pacific Air Arcades | Amusement Park |

Screen

Fig. 28

| Place Name | Place Type |
|---|---|
| Pacific Air Conditioner Care | Air Conditioner Service |
| Pacific Air Conditioner Repairs | Air Conditioner Service |
| Pacific Air Conditioner Services | Air Conditioner Service |
| Pacific Air Conditioning Center | Air Conditioner Service |
| Pacific Air Conditioning Installers | Air Conditioner Service |
| Pacific Air Conditioning Repairs | Air Conditioner Service |
| Pacific Air Control Devices | Precision Device Mfr. |
| Pacific Air Controlled Mattresses | Mattress Retail |
| Pacific Air Medical | Medical Equipment |
| Pacific Air Quality Control Board | Government Agency |
| Pacific Air Arcades | Amusement Park |

Screen

Fig. 29

| Place Name | Place Type |
|---|---|
| Pacific Air Control Devices | Precision Device Mfr. |
| Pacific Air Controlled Mattresses | Mattress Retail |
| Pacific Air Medical | Medical Equipment |
| Pacific Air Quality Control Board | Government Agency |
| Pacific Air Arcades | Amusement Park |

Screen

Fig. 30A

| Select Name | Remove Name | ▷ |
|---|---|---|
| ◁ Remove Type | Type: Coffee & Tea House<br>Name: Cafe Luna<br>Address: 123 Main St, Irvine, CA | ▷ Remove Chain |
| | Cafe Luna | |
| | Cafe Luna | |
| | Cafe Luna | |
| | Cafe Luna | |

Fig. 30B

| Place Name | Place Type |
|---|---|
| Cafe Luna | Coffee & Tea House |
| Cafe Luna | Beauty Parlor |
| Cafe Luna | Coffee & Tea House |
| Cafe Luna | American Restaurant |
| Cafe Luna | Chines Restaurant |
| Cafe Luna | French Restaurant |
| Cafe Luna | Italian Restaurant |
| Cafe Luna | Mexican Restaurant |
| Cafe Luna | Vegitarian Restaurant |
| Cafe Luna | Coffee & Tea House |
| Cafe Luna Ace | Coffee Dealer |
| Cafe Luna Bean | Coffee Dealer |
| Cafe Luna Center | Coffee Dealer |
| Cafe Luna Palace | Coffee & Tea House |

Screen

DISPLAY METHOD AND APPARATUS FOR NAVIGATION SYSTEM

FIELD OF THE INVENTION

This invention relates to a display method and apparatus for a navigation system for guiding a user to a destination, and more particularly, to a display method and apparatus for a navigation system which is capable of easily and quickly specifying a destination in the navigation system when using a "Point of Interest (POI)" method by avoiding unwanted POI names or types from displaying on the navigation system.

BACKGROUND OF THE INVENTION

A navigation system performs travel guidance for enabling a user to easily and quickly reach the selected destination. A typical example is a vehicle navigation system where a user drives a car having a vehicle navigation system. Such a navigation system detects the position of the user or user's vehicle, reads out map data pertaining to an area at the current vehicle position from a data storage medium, for example, a CD-ROM (compact disc read-only memory), a DVD (digital versatile disc), or a hard disc. Alternatively, such map data can be provided to the user from a remote server through a communication network such as Internet. The navigation system displays a map image on a monitor screen while superimposing a mark representing the current location of the user on the map image.

When a destination is set, the navigation system starts a route guidance function for setting a guided route from the start point to the destination. To determine the guided route to the destination, the navigation system calculates and determines an optimum route to the destination based on various parameters. For example, the guided route is determined based on the shortest way to reach the destination, the route preferring freeways to surface roads, the least expensive way to the destination, or the route without using toll road, and the like.

During the route guidance, the navigation system reads the nodes data from the data storage medium such as DVD and successively stores the nodes data of road segments (expressed in longitude and latitude) constituting the guided route in a memory. In the actual traveling, the node series stored in the memory is searched for a portion of the guided route to be displayed in a map display area of the monitor screen, and the portion of the guided route is highlighted so as to be discriminable from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a user of the desired one of roads or directions selectable at the intersection. Such route guidance by the navigation system is also given by voice instruction.

FIGS. 1A-1H show an example of overall procedure and screen display involved in the navigation system. FIG. 1A shows an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen. However, in this situation, the navigation system does not perform the route guidance function because the destination is not specified.

FIGS. 1B-1D show an example of process for specifying a destination in the navigation system. A main menu screen such as shown in FIG. 1B displays menu items including a "Destination" menu for entering the destination. When selecting "Destination", the navigation system displays an "Find Destination by" screen as shown in FIG. 1C for specifying an input method for selecting the destination. The "Find Destination By" screen lists various methods for selecting the destination including "Address" for specifying the city and address of the destination, "Intersection" for specifying the names of two streets which intersect with one another, and "Point of Interest" (POI) for selecting the programmed destination based on the name, category or telephone number. Other methods in the "Find Destination by" screen include "Recent Route" for specifying the destination based on the recent history of destinations saved in the navigation system, and "Address Book" for selecting the address of the destination out of the prescribed address list stored in the system.

When selecting, for example, the "Point of Interest" method in FIG. 1C, the navigation system displays selection methods of point of interest (POI) either by "Place Name" or "Place Type" in FIG. 1D. The "Place Name" is to specify a name of POI, and the "Place Type" is to specify a category of POI. If the "Place Name" is selected in FIG. 1D, the navigation system shows an "Enter Place Name" screen such as shown in FIG. 1E. The screen of FIG. 1E is basically a keyboard for inputting the name in an input box on the monitor screen. The user inputs the name of the desired POI in the input box through the keyboard.

FIG. 1F shows a "Confirm Route" screen of the navigation system for confirming the destination. In this example, the "Confirm Route" screen lists the name, address and phone number of the destination (i.e., the POI specified by the user). If this is the correct destination, the user enters an "OK to Proceed" key to proceed to the next procedure.

In FIG. 1G, the navigation system calculates and determines a guided route to the destination, i.e., the selected POI. The navigation system determines a route to the destination based on, for example, the shortest way to reach the destination, the route using as much freeway as practical or the route without using toll road, and the like. In this example, the navigation system displays a progress scale of the calculation of the route.

After determining the guided route, the navigation system starts the route guidance as shown in FIG. 1H. Typically, the navigation system shows the intersection which is highlighted to show the next turn and a direction of the turn. Such route guidance by the navigation system is also given by voice instruction.

In the process of specifying the destination by the "Point of Interest (POI)" method described above, because the recent storage medium provides a large volume of data involved in this input method, it requires relatively many steps until finally selecting the destination. Further, when there are a large number of POIs in a relatively small area, too many POIs will be displayed, which makes it difficult for the user to find the desired one.

For example, when finding a POI through a category such as "restaurant" in a downtown area, many POI names will appear on the navigation display, requiring the user to scroll many pages of the screen and to see many POI names. In another example, when the user does not know the exact name of the POI, thus, only a portion of the name is input through the keyboard, the navigation system will detect a large number of POIs including the portion of that name. Thus, it takes a long time to find a correct POI name by scrolling many pages of the list, which may adversely affect the safe driving.

Therefore, there is a need for a navigation system which can easily and quickly specify the destination through the "Point of Interest" method.

SUMMARY OF THE INVENTION

It is, therefore, an object of the present invention to provide a navigation system which enables a user to easily and quickly search names on a name list and determine the destination in the navigation system when using a "Point of Interest (POI)" method.

It is another object of the present invention to provide a navigation system which enables a user to easily and quickly find a desired POI name from a name list by preventing unwanted POI names from appearing on the monitor screen.

It is a further object of the present invention to provide a navigation system which enables a user to easily and quickly find a desired POI name from a name list by preventing the same type of POIs from appearing on the monitor screen when a specific POI name is selected.

In the display method apparatus of the present invention, the navigation system is designed to enable a user to quickly select a destination through the POI method by selecting an unwanted POI name or removing the unwanted POI names from the POI name list. The navigation system is also capable of preventing the same type of POIs with different names from appearing on the monitor screen when a specific POI name is selected by the user.

More specifically, the method of the present invention includes the steps of displaying a "Point of Interest (POI)" name list based on an instruction specified by a user, selecting an unwanted POI name in the POI name list, and removing all POIs having the unwanted POI name from the POI name list. As a variation, the last step above may be modified as removing all POIs having both the unwanted POI name and the unwanted POI type from the POI name list. If necessary, the above steps of selecting the unwanted POI name and removing the unwanted POI names from the POI name list are repeated.

In another aspect, the method of the present invention includes the steps of displaying a "Point of Interest (POI)" name list based on an instruction specified by a user, selecting an unwanted POI name in the POI name list, executing either a first removal function for removing POIs having the unwanted POI name or a second removal function for removing POIs of same type as that of the unwanted POI name, removing all POIs having the unwanted POI name from the POI name list when the first removal function is executed and removing all POIs in the same type as that of the unwanted POI name when the second removal function is executed.

A further aspect of the present invention is a display apparatus for a navigation system. The display apparatus is constituted by various means for achieving the display methods described above which utilizes the method of preventing unwanted names from appearing on the screen.

According to the present invention, the navigation system enables the user to quickly and easily see names on the POI name list and to determine the destination. Because the user is not required to define the specific POI names or types to exclude before viewing the full list of POI name, but instead is allowed to see the names on the full list first and has the freedom to exclude any unwanted names or types, the operation is more flexible and efficient. As the result of the reduced number of POI names in the list, the user can easily and quickly find the desired POI.

BRIEF DESCRIPTION OF THE DRAWINGS

FIGS. 4A-4D are schematic diagrams showing an example of operation and screen display for selecting the destination (POI) by specifying a category of POIs.

FIGS. 5A-5B are schematic diagrams showing an example of name list showing POI names obtained as a result of search through the process of FIGS. 4A-4D.

FIGS. 6A-6B are schematic diagrams showing an example of display in the navigation system of the present invention for removing a specific POI name from the POI name list.

FIGS. 7A-7B are schematic diagrams showing an example of display in the navigation system for further removing a specific POI name from the POI name list after the process of FIG. 6A-6B.

FIGS. 8A-8B are schematic diagrams showing an example of display in the navigation system for further removing a specified POI name from the POI name list after the process of FIG. 7A-7B.

FIGS. 9A-9B are schematic diagrams showing an example of display in the navigation system for scrolling the POI name list after the process of FIG. 8A-8B.

FIGS. 10A-10D are schematic diagrams showing a process and screen display in the navigation system for confirming the destination and performing the route guidance to the destination.

FIGS. 11A-11D are schematic diagrams showing an example of operation and screen display for selecting the destination by inputting a name of POI.

FIGS. 12A-12B are schematic diagrams showing an example of display in the navigation system for removing a specific POI name from the POI name list.

FIGS. 13A-13B are schematic diagrams showing an example of display in the navigation system for further removing a specific POI name from the POI name list after the process of FIG. 12A-12B.

FIGS. 14A-14B are schematic diagrams showing an example of display in the navigation system for scrolling the POI name list after the process of FIGS. 13A-13B.

FIGS. 15A-15B are schematic diagrams showing an example of display in the navigation system for selecting a destination from the POI name list.

FIGS. 16A-16D are schematic diagrams showing an example of display in the navigation system for removing POI names or same type of POIs from the POI name list based on a specific POI name selected by the user.

FIGS. 17A-17B are schematic diagrams showing an example of display in the navigation system for listing the POI names and removing the selected POI names from the POI name list.

FIGS. 18A-18B are schematic diagrams showing an example of display in the navigation system for listing the POI names and removing the selected POI names from the POI name list after the process of FIGS. 17A-17B.

FIGS. 19A-19B are schematic diagrams showing an example of display in the navigation system for listing the POI names and removing the selected POI names from the POI name list after the process of FIGS. 18A-18B.

FIG. 20 is a schematic diagram showing an example of display in the navigation system for listing the POI names after the removal process of FIGS. 19A-19B.

FIG. 21 is a schematic diagram showing an example of display in the navigation system for listing the POI names incorporating new entries of POIs in the space created in the removal process of the present invention.

FIGS. 23A-23F are schematic diagrams showing an example of operation and screen display for listing POI names and removing POI names by specifying POI types or POI chain in the navigation system of the present invention.

FIG. 24 is a schematic diagram showing an example of a list of POI names and corresponding POI types for use in the navigation system for removing the unwanted POIs by selecting the unwanted POI types.

FIG. 25 is a schematic diagram showing an example of a list of POI names and corresponding POI types for use in the navigation system for removing the unwanted POIs by selecting the unwanted POI types.

FIG. 26 is a schematic diagram showing an example of a POI name list and a corresponding POI type list in the navigation system of the present invention after the removal process of FIG. 25.

FIG. 27 is a schematic diagram showing an example of a POI name list and a corresponding POI type list in the navigation system of the present invention after the removal process of FIG. 26.

FIG. 28 is a schematic diagram showing an example of a POI name list and a corresponding POI type list in the navigation system of the present invention after the removal process of FIG. 27.

FIG. 29 is a schematic diagram showing an example of a POI name list and a corresponding POI type list in the navigation system of the present invention after the removal process of FIG. 28.

FIGS. 30A-30D are schematic diagrams showing an example of screen display for listing POI names and removing POIs by specifying a POI name and a POI type in the navigation system of the present invention.

DETAILED DESCRIPTION OF THE INVENTION

The present invention will be described in detail with reference to the accompanying drawings. The navigation system of the present invention is designed to enable a user to quickly specify the destination when mainly using the "Point of Interest (POI)" input method. In accordance with the present invention, a user can quickly find a desired POI and specify the POI as his destination through the POI input method by removing unwanted POI names or POI types from displaying on the monitor screen. Therefore, the number of POIs in the name list is reduced and thus the displayed name list is simplified, thereby enabling to quickly find out the desired destination.

Figure 2:
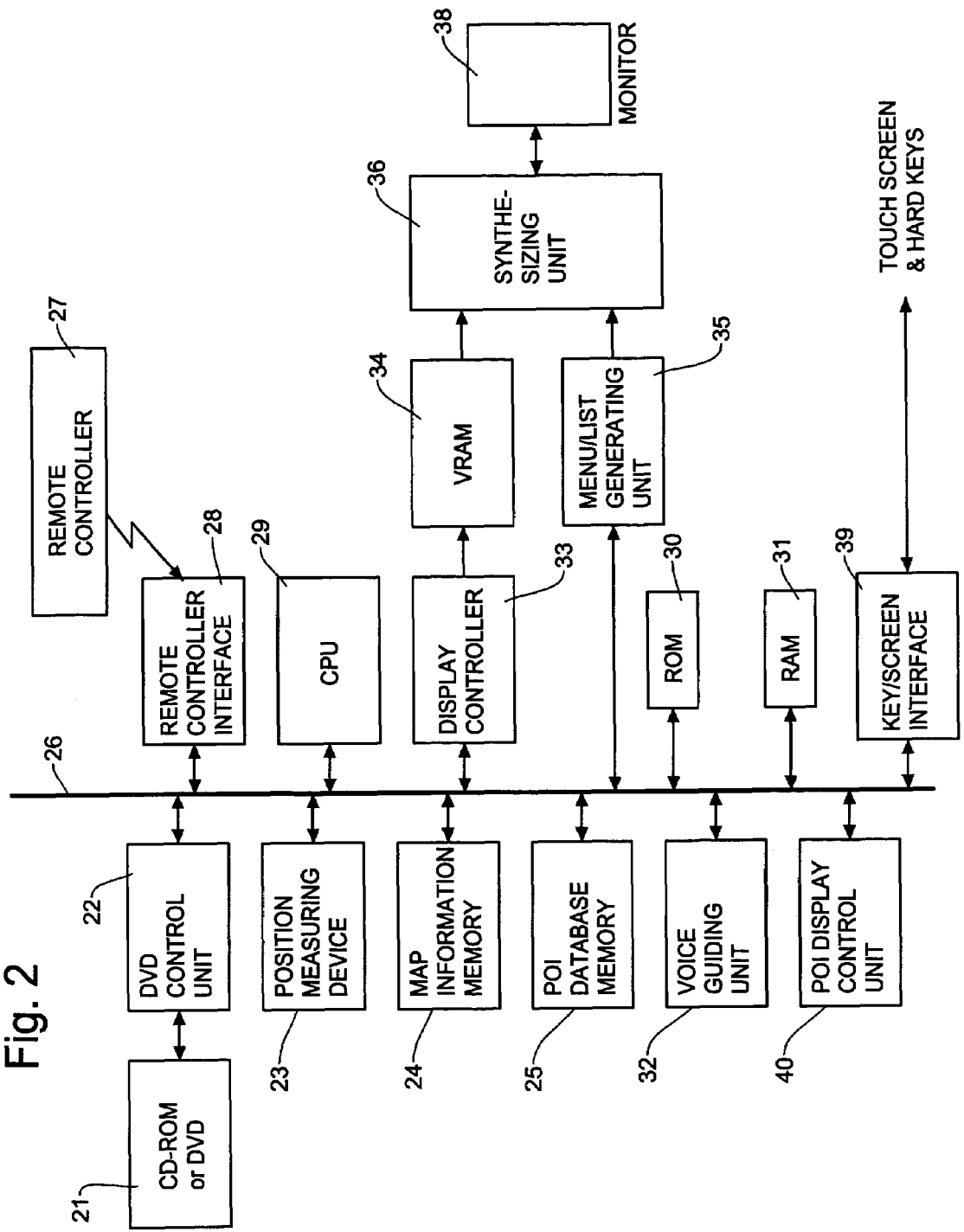
FIG. 2 is a block diagram showing an example of structure in the vehicle navigation system for implementing the present invention.

FIG. 2 shows an example of structure of a vehicle navigation system implementing the present invention, although the present invention can also be applied to a portable navigation device such as a one implemented by a PDA (personal digital assistant) device or other hand-held devices. In the block diagram of FIG. 2, the navigation system includes a map data storage medium 21 such as a CD-ROM, DVD, hard disc or the like (hereafter "DVD") for storing map information, a DVD control unit 22 for controlling an operation for reading the map information from the DVD, a position measuring device 23 for measuring the present vehicle position. The position measuring device 23 includes a vehicle speed sensor for detecting a moving distance, a gyro for detecting a moving direction, a microprocessor for calculating a position, a GPS receiver, and etc.

The block diagram of FIG. 2 further includes a map information memory 24 for storing the map information which is read out from the DVD 21, a database memory 25 for storing database information such as point of interest (POI) information which is read out from the DVD 21, a remote controller 27 for executing a menu selection operation, an enlarge/reduce operation, a destination input operation, etc. and a remote controller interface 28.

Figure 3A:
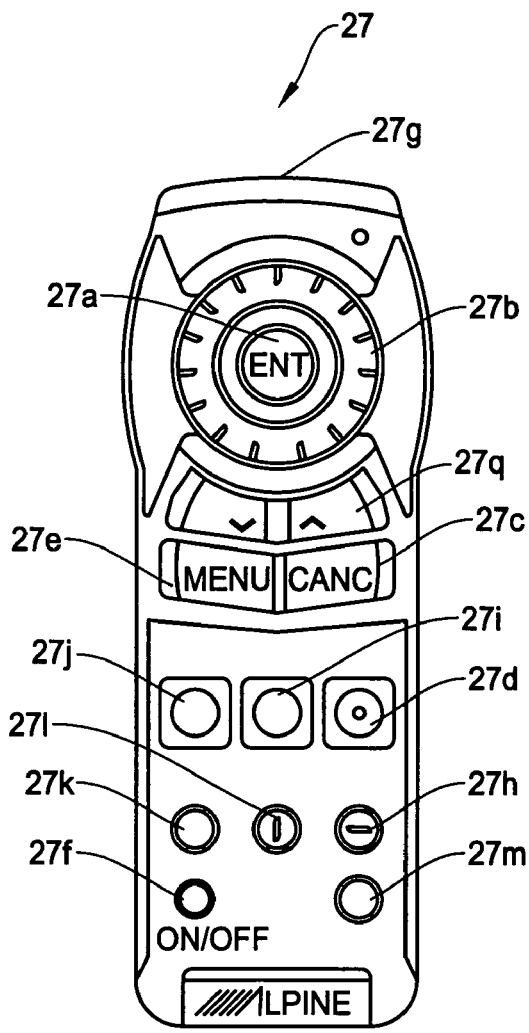
FIGS. 3A and 3B are diagrams showing an example of a remote controller accompanied by the vehicle navigation system of FIG. 2.
Figure 3B:
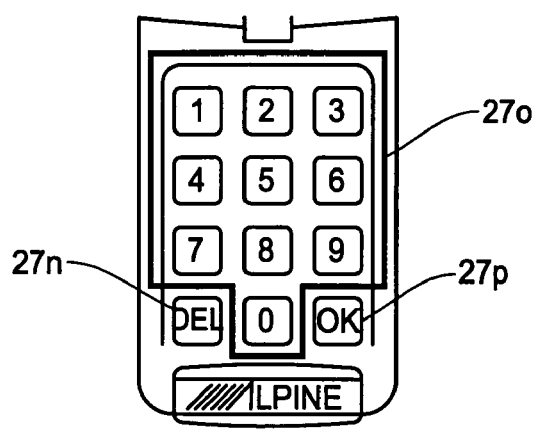

The remote controller 27 has a variety of function keys as shown in FIG. 3A and numeric keys as shown in FIG. 3B. The numeric keys appear when a lid in the lower part of FIG. 3A is opened. The remote controller 27 includes a joy stick/enter key 27a, a rotary encoder 27b, a cancel key 27c, an MP/RG key 27d, a menu key 27e, a zoom/scroll key 27q, a monitor ON/OFF key 27f, a remote control transmitter 27g, a plan key 27h, an N/H key 27i, a voice key 27j, a list key 27k, a detour key 27l, a delete destination key 27m, a delete key 27n, numeric keys 27o, and an OK key 27p.

The joy stick/enter key 27a selects highlighted items within the menu and moves map displays and a vehicle position icon. The rotary encoder 27b changes zoom scale, scrolls list pages, moves the cursor, and etc. The cancel key 27c cancels the present displayed screen or is operated when returning the screen to the previous menu screen. The MP/RG key 27d toggles between detailed map display and basic guide display during guidance. The menu key 27e displays the main menu. The plan key 27h starts the guidance to the route set by Today's Plan function, the N/H key 27i changes between north-up and heading-up orientation, the voice key 27j initiates voice instruction.

Although a remote controller such as described above is a typical example for selecting menus, executing selected functions and etc., the navigation system includes various other input methods to achieve the same and similar operations done through the remote controller. For example, the navigation system includes hard keys and a joy stick on a head unit of the navigation system mounted on a dash board, touch screen of the display panel, and voice communication means.

Referring back to FIG. 2, the navigation system further includes a bus 26 for interfacing the above units in the system, a processor (CPU) 29 for controlling an overall operation of the navigation system, a ROM 30 for storing various control programs such as a route search program and a map matching program necessary for navigation control, a RAM 31 for storing a processing result such as a guide route, a voice interface and guiding unit 32 for voice communication interface and spoken instructions, a display controller 33 for generating map image (a map guide image and an arrow guide image) on the basis of the map information, a VRAM (video RAM) 34 for storing images generated by the display controller, a menu/list generating unit 35 for generating menu image/various list images, a synthesizing unit 35, a key and screen interface 39 for interfacing with various input means other than the remote controller 27, and a POI display controller 40 for controlling a POI removal operation in accordance with the present invention.

To facilitate a better understanding of the present invention, a typical process and display examples for listing the selected type of POIs on the screen of the navigation system are shown in FIGS. 4A-4D and FIGS. 5A-5B. Suppose a user already had some fast food for lunch, and thus, he wants something nicer for dinner, but cannot decide what kind of food to eat. The user decides to list restaurants of all food types in the nearby area to see what food types may be available that would appeal to him.

Figure 1A:
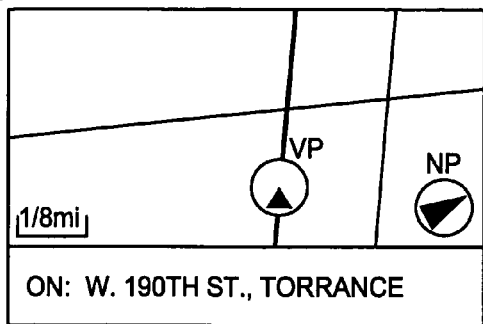
FIGS. 1A-1H are schematic diagrams showing an example of operational process and screen display involved in the navigation system for selecting a destination.
Figure 1B:
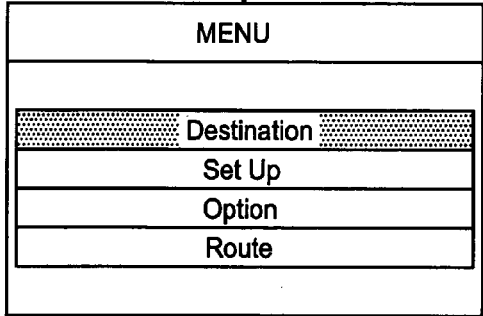
Figure 1C:
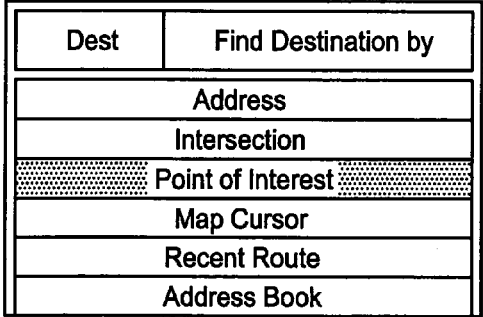
Figure 1D:
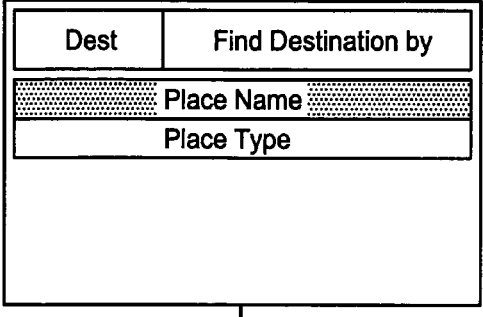
Figure 1E:
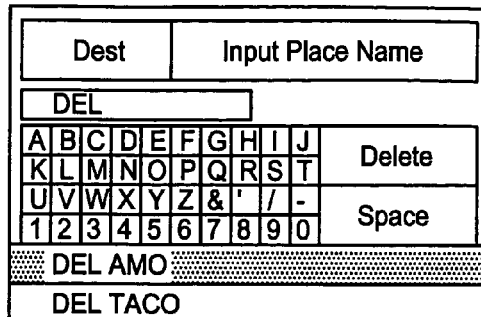

FIG. 4A shows an example of screen listing the various input methods for selecting the destination, which is basically the same as that shown in FIG. 1B. In FIG. 4A, by selecting "Point of Interest", the navigation system displays a "Find Point of Interest By" screen shown in FIG. 4B. As shown in this example, this screen typically lists two menus, "Place Name" and "Place Type". The "Place Name" selection method is to search for points of interest (POIs) through names of POIs and the "Place Type" selection method is to search for POIs through categories of POIs. In FIG. 4B, by selecting the "Place Type", the navigation system displays a "Select Category" screen shown in FIG. 4C to select a category of POI such as "ATM", "Automotive", "Bank", "Restaurant", "Hotel", "Shopping" or others.

By selecting "Restaurant" in FIG. 4C, the navigation system displays a "Find Place By" screen to select an order of listing the POIs as shown in FIG. 4D. In this example, the methods include "Sort by Distance", "Name" and "Within a City". If the "Sort by Distance" method is selected, the navigation system lists predetermined number of POIs, such as 1000 POIs of the selected type of POIs, in the order of distance from the user position (ex. current vehicle position). If the "Name" method is selected, the navigation system lists POI names in the selected category in the alphabetical order. When the "Within a City" method is selected, the navigation system lists all POIs in the alphabetical order within the city the user has specified.

By selecting the "Sort by Distance" in this case, the navigation system displays all types of restaurants on a POI name list in the order of distance from the user position (ex. current vehicle position) as shown in FIG. 5A. The user may need to scroll the name list of restaurants on the screen until a preferred restaurant is found. Suppose one screen of the navigation system displays four POIs, the restaurants sorted by distance are arranged in the manner shown in FIG. 5B constituting six pages of POI name list. Accordingly, the user has to scroll the pages of the name list to find out a desired restaurant.

In the example of FIG. 5A, the screen shows the address and phone number of the highlighted restaurant name "McDonalds". As the user already had fast food for lunch, he may scroll and skip many fast food restaurants in the name list. Then, finally the user finds out the name "Mimi's Cafe" that may match his desire at page 6 of the POI name list shown in FIG. 5B. The user decides to select the "Mimi's Cafe" as his destination.

As in the foregoing example, it takes a long time to find out a desired POI, a nice restaurant in this case, by scrolling the long name list. In the example of FIG. 5B, the restaurant the user wants to go is listed on page 6 of the name list. Especially, when a user does not specify what kind of food he wants, i.e., when only a large category of POI is specified, a POI name list includes a large number of entries and becomes relatively long. Such a long list avails the user a freedom of choice from various kinds of restaurants. However, the user has to check many restaurants by scrolling the long name list until he finds a restaurant that he wants to go.

Especially in an urban area, there are many fast food chain restaurants, such as McDonalds, Burger King, Pizza Hut, Carl's Jr and the like. Therefore, in many instances, the POI name list ordinarily includes the same names repeatedly as in the example of FIG. 5B. As a result, the user has to see the same name many times. When the POI names are listed in the order of distance, the same name usually comes out randomly in the name list.

Therefore, in the present invention, the navigation system provides the user an effective method to search the POI name list. With reference to FIGS. 6A-l0D, the main feature of hiding unwanted names in the present invention is explained below. FIG. 6A shows an example of screen of the navigation system implementing the present invention and FIG. 6B shows a POI name list for illustrating the effect of the present invention. The navigation screen of FIG. 6A includes a "Remove" key 61 for removing a POI name selected by the user from the POI name list.

Since the user had fast food for lunch and wants to have something nicer for dinner, fast food chain restaurants will be a good candidate to be removed from the POI name list. As shown in FIG. 6B, there are several names which are listed two or more times on the POI name list through pages one to six. For example, "McDonalds" is listed four times, and "Pizza Hat" is listed three times. Although the user may not know the specific numbers of times, he can easily imagine that many chain restaurant names may be repeated in the POI name list. Thus, in the example of FIG. 6A, the user selects the second name "McDonalds" by highlighting this name. Then the user activates the "Remove" key 61 by, for example, tilting the joy stick 27a to right (hereafter also called "right click") of the remote controller 27 of FIG. 3A. In response, the navigation system removes "McDonalds" from the POI name list.

With this operation, all "McDonalds" restaurants (unwanted names) are hidden from the POI name list in FIGS. 7A and 7B. In FIG. 7B, parenthesized names are indicated as unwanted restaurant names and are removed from the original list, i.e., not displayed on the actual navigation system. Here, all of "McDonalds" are removed from the original name list and other names listed following the "McDonalds" are moved up in the name list. Thus, in FIG. 7B, the names "Pizza Hut", "Burger King" and "El Torito" are displayed on the first page of the name list.

In this manner, the other names are moved up to fill in the spaces where the "McDonalds" has been removed, resulting in five pages of POI name list in FIG. 7B rather than six pages shown in FIG. 6B. Thus, the number of entries in the POI name list becomes smaller as the number of hidden duplicated names becomes larger. As a result, the user saves time to see the POI names on the POI name list.

Suppose that the user is not interested in the names in the first page of the name list, and then finds other names of chain-restaurants in the name list, "Pizza Hut" and "Burger King". The user is not interested in either of the restaurants and wants to remove these restaurants from displaying on the screen. Thus, in FIG. 7A, the user selects "Pizza Hut" and executes (right click) the "Remove" key 61 in the manner similar to that of FIG. 6A.

Then, another updated screen such as shown in FIG. 8A will be displayed which is based on the POI name list of FIG. 8B. Again, the names "McDonalds" and "Pizza Hut" in the parentheses in FIG. 8B are removed from the POI name list and are not displayed on the actual screen. Since three entries of "Pizza Hut" are removed, the total number of the listed names is further decreased, resulting in four pages of POI name list as shown in FIG. 8B.

Again, in FIG. 8A, the user highlights "Burger King" as an unwanted restaurant and activates the "Remove" key 61. Then, another updated screen such as shown in FIG. 9A will be displayed which is based on the POI name list of FIG. 9B. The names "McDonalds", "Pizza Hut" and "Burger King" in the parentheses in FIG. 9B are removed from the POI name list and are not displayed on the screen. Since two entries of "Burger King" are removed, the total number of the listed names is further decreased, resulting in three pages of name list. Since the total number of name list is reduced and the unwanted names are not displayed, the user can easily find a desired restaurant by scrolling the screen.

Figure 1F:
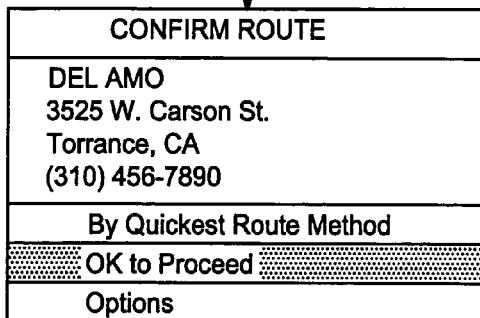
Figure 1G:
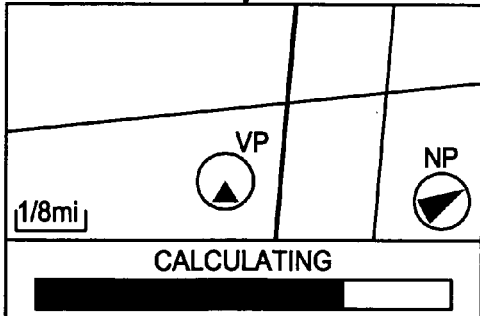
Figure 1H:
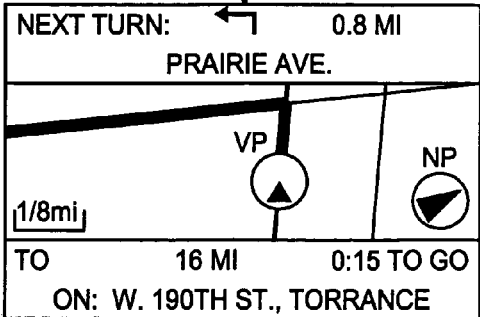

Accordingly, by scrolling only three pages, the user finds the restaurant "Mimi's Cafe" in the name list as shown in FIG. 10A. FIGS. 10B-10D correspond to FIGS. 1F-1H described above. FIG. 10B shows a "Confirm Route" screen of the navigation system for confirming the destination "Mimi's Cafe". The "Confirm Route" screen lists the name, address and phone number of "Mimi's Cafe". If this is the correct destination, the user enters an "OK to Proceed" key to proceed to the next procedure.

In FIG. 10C, the navigation system calculates and determines a guided route to the destination. The navigation system determines a route to the destination based on a predetermined method such as a shortest way to reach the destination. In this example, the navigation system displays a progress scale of the calculation of the route. After determining the guided route, the navigation system starts the route guidance as shown in FIG. 10D. Typically, the navigation system shows the intersection which is highlighted to show the next turn and a direction of the turn, which is accompanied by voice instructions.

In the foregoing, the present invention has been described for the case where unwanted names of POIs are removed from the name list which is produced for the selected category "Restaurant" where the POI names are listed in the order of distance. The present invention can be applied to a list of POI names in which the names are searched and listed in an alphabetical order. With reference to FIGS. 11A-15B, an example of operation and display example involving the alphabetical order POI names is explained in the following.

In a case where a user wants to go to a store "Mario Toys" but does not know the exact name of it, although he is confident that the first two characters are "ma", the present invention shown in FIGS. 11A-15B is advantageously applied to search the destination quickly. FIGS. 11A-11B show a process and display examples for finding a POI name "Mario Toys" through the "Point of Interest" input method. When selecting the "Point of Interest" in FIG. 11A, the navigation system displays the "Find Point of Interest By" screen to prompt the user to select either the "Place Name" or "Place Type" as shown in FIG. 11B.

In this case, the user selects the "Place Name" to specify the first two characters noted above. The navigation system displays an "Input Name" screen which includes a keyboard as shown in FIG. 11C. The navigation system starts searching the POIs as soon as any character or a predetermined number of character is input through the keyboard. Thus, when the user inputs "MA", the navigation system retrieves POI names which start by the characters "Ma" as shown in FIG. 11D.

Typically, the navigation system is set so that the POIs of predetermined number within a predetermined distance, such as 30 miles, from the user (ex. current vehicle position) will be retrieved. As a result, the navigation system produces a POI name list such as shown in FIG. 12B where the first four entries are displayed on the screen as shown in FIG. 12A. In the case of retrieving the POI names in the alphabetical order like this example, the same names are always listed in series. Namely, the user is able to choose unwanted POI names more easily even if he does not know whether it is a chain store.

In this case, the user notices that there are two names of "Macy's" on the POI name list in series on the first page of screen. On the second and third pages, "Mail Boxes Etc" are repeated as shown in FIG. 11B. In the same manner as described with reference to FIGS. 5A-9B, the user will select the unwanted name, and the POI removal process is conducted for the list of POI names in the alphabetical order. Thus, the user selects "Macy's" and executes the "Remove" key 61 in FIG. 12A.

Then, the navigation system displays an updated screen of FIG. 13A which is based on the name list of FIG. 13B. As shown in FIG. 13B, the specified name "Macy's" in the parentheses are removed from the POI name list and are not displayed. Since the number of entries is reduced and other POI names are moved up to fill in the spaces where the names "Macy's" are removed, the POI name list becomes smaller constituting three pages of screen. In FIG. 13A, the user again selects the next entry "Mail Box Etc" and executes (right click) the "Remove" key 61.

With this operation, all of "Mail Box Etc" are removed from the name list as shown in FIGS. 14A and 14B. Since four entries of "Mail Box Etc" are no longer included, the POI name list becomes even smaller with only two pages. Thus, the user scrolls the screen and finds "Mario Toys" as shown in FIG. 15A. Since "Macy's" and "Mail Box Etc" are removed from the POI name list as shown in FIG. 15B, such a scroll operation can be done easily and quickly. Through the same process of FIGS. 10A-10D, the selected destination is confirmed and the optimum route to the destination is calculated, resulting in the route guidance to the destination.

The display method of the present invention can be applied not only to the removal of single, specified POI name in each removal operation but also to a same kind of POI with different POI names. Namely, in the example of FIGS. 5A-9B where the POI names are listed based on the selected category and distance, it is also possible to modify the feature of the present invention such that when a user selects a POI name such as chain restaurants "McDonalds" as an unwanted POI name, then the same type of different fast food chain restaurants such as "Burger King", "Carl's Jr" and "Wendy's" are also removed from the original name list. Since this method functions to remove two or more different POI names at the same time, it enables the user to find the desired restaurant quickly with a smaller number of key operations.

Similarly, in the example of FIGS. 11A-15B where the POI names are listed based on the alphabetical order, it is possible to remove different POI names from the name list by removing the same type of POIs from the name list. For example, if the user decides to remove the name "Macy's", all names belonging to the same type of department stores, such as "JC Penny's", "Nordstrom", "Emporium", etc. are also removed from the original name list. If the user removes the name of "Office Max", all POI names belonging to the same type of office supply stores, such as "Staples", "Office Depo", etc., are also removed from the POI name list.

To achieve this, it is necessary to provide data for classifying categories or sub-categories of POIs in the POI data base such as DVD. The POI display controller 40 of FIG. 2 finds the same category or sub-category (such as "fast food", "department store" or "office supply" in the above examples) and removes all the POIs in the same category from displaying on the screen. The system allows the user to choose either the function of removing POIs of the specified name or the function of removing POIs of the same type with any name. The user can also apply both functions to a list in succession. For example, if the user is looking for a Mexican restaurant with a unique taste, it is possible to remove the fast food type to avoid cheap take-out places, then to remove common chain names like "El Torito" and "Acapulco".

FIGS. 16A-16D show an example of screen for removing either a single POI name (first removal function) or same type of different POI names (second removal function) FIGS. 16A-16B show a case where only a specified name is removed from the name list at each operation. FIGS. 16C-16D show a case where same type of POIs with different POI names are removed from the name list based on the specified POI name at each operation. In this example, as shown in FIGS. 16A and 16C, the monitor screen includes a "Remove selected name" key for right click and a "Remove same type" key for left click.

In the example of FIGS. 16A-16B, which shows the first removal function, the user selects an unwanted POI name, for example, "McDonalds" and executes the "Remove selected name" key (right click). In response, the navigation system removes all entries showing the name "McDonalds" from the POI name list as shown by the parentheses in FIG. 16B. If the user wants to further remove the other name, the same procedure will be repeated. In this manner, in the first removal function, the unwanted name is removed from the POI name list one by one.

In the example of FIGS. 16C-16D, which shows the second removal function, the user selects an unwanted POI name such as "McDonalds" and executes the "Remove same type" key (left click) in FIG. 16C. In response, as shown in FIG. 16D, the navigation system removes all entries showing the name "McDonalds" as well as different names with the same type of POIs as that of "McDonalds", i.e., fast food restaurants, from the POI name list. Thus, POI names "Pizza Hut" "Burger King", "Taco Bell", "Domino Pizza" and "Carl's Jr." are also removed from the POI list. In this manner, in the second removal function, when the unwanted POI name is selected, the same type of POIs with two or more different names are also removed from the POI name list at each operation.

FIGS. 17A-21 show the POI name list and the screen of the navigation system in the display method of the present invention in which names of restaurant are listed in the manner similar to the example of FIGS. 5A-9B. In this example, new entries are added to the name list in the spaces created by removing the unwanted POI names. FIG. 17A shows a list of POI names where first four entries are displayed on the screen of the navigation system. Typically, the maximum number of POI entries in one name list is several dozen, such as 32 entries in this example. Thus, if the removal reduces the number of remaining entries below a predetermined threshold, or if the user controls the name list beyond a predetermined entry near either end of the read buffer, the system populates the read buffer with additional POIs from the database.

In FIG. 17B, an entry "Burger King" is selected and the remove key is activated (ex. right click). Thus, "Burger King" in the parentheses are removed from the list as shown in FIG. 18A, thereby reducing the total number of POI names in the POI name list. In FIG. 18B, another entry "Pizza Hut" is selected and the remove key is activated. Thus, "Pizza Hut" in the parentheses of FIG. 18B are removed from the POI name list, which results in the POI name list of further reduced entries as shown in FIG. 19A.

In FIG. 19B, another entry "McDonalds" is selected and the remove key is activated, which results in the POI name list of further reduced entries as shown in FIG. 20. Suppose the user requests a POI name list of restaurant sorted by distance, as shown in FIG. 21, a new POI name list is created which includes new entries of POIs in the space created in the removal process. The new entries do not include the POI names already removed in the foregoing procedure.

Figure 22:
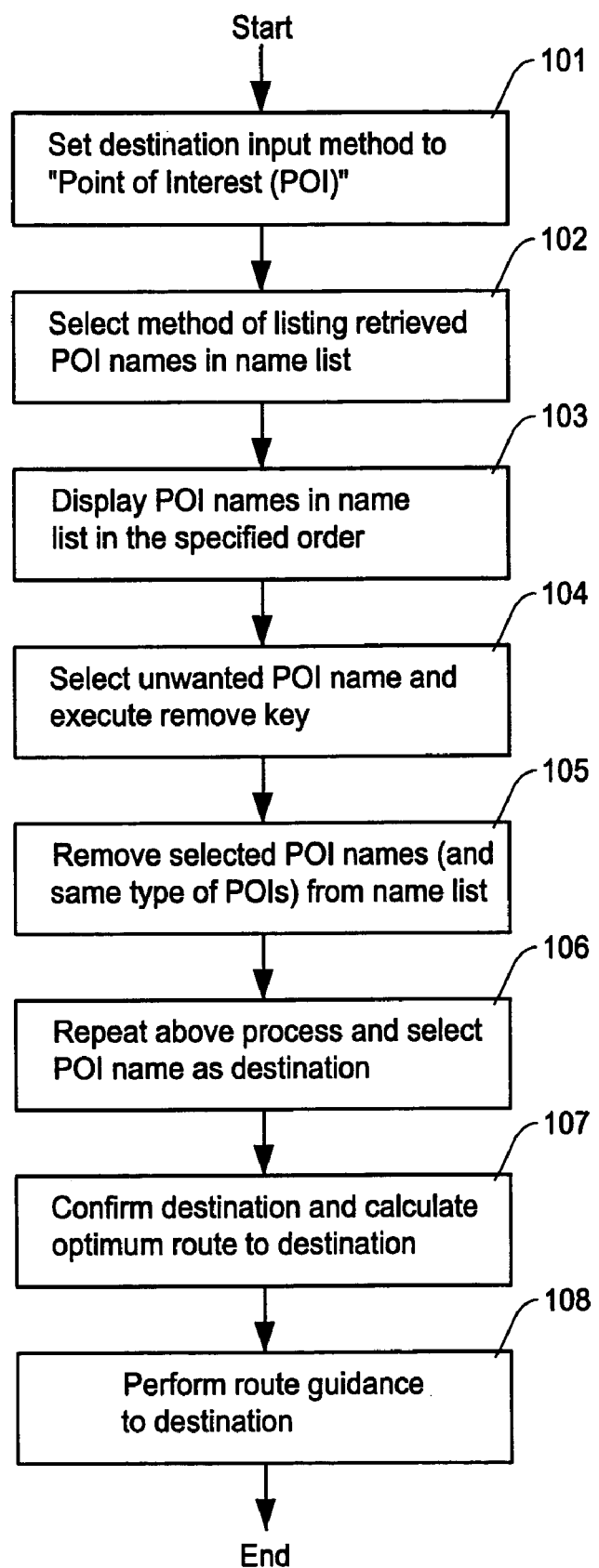
FIG. 22 is a flow chart showing an overall operation of the present invention for selecting and removing POI names from the POI name list.

A flow chart of FIG. 22 summarizes an overall operation of the present invention for selecting and removing POI names from the POI name list. At step 101, the user selects the "Point of Interest (POI)" method as a method for retrieving data for listing possible destinations. Then, as shown in FIG. 4B, the navigation system displays and prompts the user to select either the "Place Name" or the "Place Type" method. When the user selects one of "Place Name" and "Place Type", at step 102, the navigation system prompts the user to select a method for determining an order for listing the POI names.

Based on the above procedure, in step 103, the navigation system produces a POI name list which contains the maximum entries of several dozen POI names. At step 104, the user selects an unwanted POI name and execute the remove key. As described above, the present invention enables the user to remove only the specified POI name, or two or more different POI names with same type of POIs. Thus, at step 105, the navigation system removes the specified POI name or different POI names with same type from the POI name list on the navigation screen.

By repeating this procedure at step 106, the number of entries in the POI name list is reduced so that the user can easily and quickly find a destination that he wants. Thus, at step 107, the user confirms the selected destination and the navigation system calculates and determines an optimum route to the destination. Then, in step 108, the navigation system performs the route guidance to guide the user to the selected destination.

FIGS. 23-31 show further examples of the present invention which illustrates a case in which there are many businesses of similar names. FIGS. 23A-23F are schematic diagrams showing display examples of the navigation system of the present invention for collecting a list of POIs by specifying a place name. When selecting the "Point of Interest" in FIG. 23A, the navigation system displays the "Find Point of Interest By" screen to prompt the user to select either the "Place Name" or "Place Type" as shown in FIG. 23B. In this case, the user selects the "Place Name" and inputs the place name through a keyboard of FIG. 23C. In this example, based on the input by the user, the navigation system lists the place names having "PACIFIC" at the tops in the alphabetical order.

The navigation system in this example does not repeat an identical name in the name list. Instead, a single entry appears with an icon that indicates that multiple locations exist. For example, in the screen of FIG. 23D, the place name "Pacific Acres" appears with an icon (square shaped icon at the left of the name), which has two types, i.e., "Real Estate" and "Campground" (FIG. 24). Similarly, in the screen of FIG. 23D, the place name "Pacific Age Cafe" is also accompanied by the icon, indicating that there are two or more places. In this case, there is only one type "Coffee & Tea Houses" (FIG. 24), but with different locations.

When such a multiple location is selected, as in the case of FIG. 23E, the navigation system may show a message "8 locations share this name" and prompts the user to select the method for listing the place name. For example, in FIG. 23E, the navigation system guides the user to select either the "sort by distance" method or "sort by place type" method. If the user selects "Type", i.e., the "sort by place type" method, the navigation system moves to the subsequent screen such as a keyboard screen of FIG. 23F so that the user is able to specify the place type.

FIG. 24 shows an example of POI name list in the alphabetical order extracted in response to the input of the place name by the user in FIG. 23C. As this example illustrates, there may be many businesses of similar names. While many chain stores have an identical name (e.g., "McDonald's", many others include the location names for indicting branch locations. For example, in FIG. 24, the same business entity "Pacific Air Cargo" includes corresponding branch names such as "Pacific Air Cargo-Atlanta", "Pacific Air Cargo-Boston", and "Pacific Air Cargo-Chicago". Also, independent businesses within an industry have similar names by coincidence, typically in different cities and states, as shown with "Pacific Air Conditioner" and Pacific Air Conditioning" in FIG. 24.

For the situation of FIG. 24 where many businesses have similar names, a process for removing the POIs from the display screen is described with reference to FIGS. 24-29. The relationship between the POI name and the POI type for each POI is shown in the lists of FIGS. 24-29. It should be noted that, in an actual navigation system, the information regarding the POI type, etc., for each POI will be displayed in the manner as shown in FIG. 23D.

Suppose the user remembers the mechanical device manufacturer as "Pacific Air", but have little idea how it could be categorized in the navigation system. After entering "PACIFIC AIR" in the keypad, the user reviews the alphabetical name list of FIG. 25 which also shows the corresponding POI type list. In the example of FIGS. 25-29, an area specified by a reference label "Screen" will be displayed on the navigation system. Without the present invention, the user would have to press down the down key twenty four (24) times or the page down key six (6) times to find the desired entry.

The user realizes that similar names of the same business appear repeatedly in the screen. Because the POI type on the screen shows "Courier Service" many times, the user decides that it is irrelevant. The user presses the left key ("Remove Type") of FIG. 23D to remove the current type "Courier Service" when the POI of this type is highlighted on the screen. Thus, in FIG. 26, the navigation system removes 13 names of "Courier Service" from the list. Now the user would be able to reach the desired entry "Pacific Air Control Devices" by pressing the down key 12 times or the page down keys 3 times.

FIG. 27 shows a case in which user presses the "Remove Type" key for the first POI on the screen of FIG. 26 so that the current type "Rental Equipment" is removed from the list. This particular type happens to have only one entry in this list, thus, only one name would be removed. As the result, the user has no efficiency gain compared to pressing the down key in this case.

FIG. 28 shows a case in which user presses the "Remove Type" key for the first POI on the screen of FIG. 27 so that the current type "Air Conditioner Rental" is removed from the list. The navigation system removes five POI names with the specified business type from the name list. In this case, although similar and may be related, the POI names of different type are not removed from the list.

FIG. 29 shows a case in which user presses the "Remove Type" key for the first POI on the screen of FIG. 28 so that the current type "Air Conditioner Service" is removed from the list. The navigation system removes six POI names with the specified business type from the name list. As the result, the user finds the desired entry "Pacific Air Control Devices" within the display area of the navigation system. Throughout this process, the user pressed the left key (remove type key) only four times. Also, the workload for reading each POI name was significantly reduced.

Figure 30C:
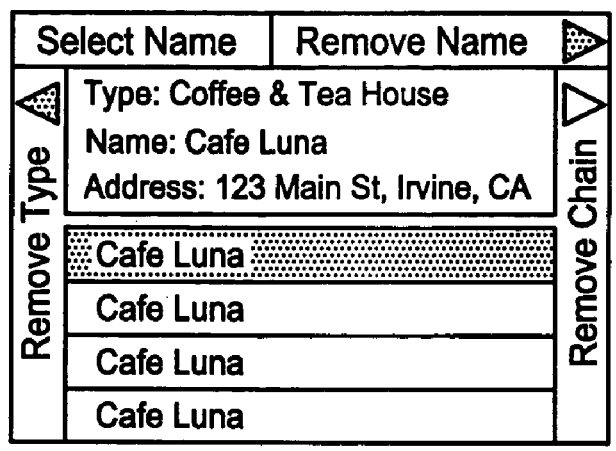

FIGS. 30A-30D are schematic diagrams showing an example of screen display for listing POI names and removing POIs by specifying a POI name and a POI type in the navigation system of the present invention. In this example, the navigation system includes a "Remove Name" key, a "Remove Type" key, and a "Remove Chain" key as shown in FIG. 30A. This example shows a case where the POIs with the same name and same business will be repeated on the screen so long as their addresses are different from one another. In FIGS. 30A-30B, the POI names carrying "Cafe Luna" are listed in the alphabetical order in response to the input "Cafe Luna" by the user when the user is looking for a coffee dealer having the business name starts with "Cafe Luna".

In the name list of FIG. 30B, the same or similar names having "Cafe Luna" show various different POI types. Suppose the user knows that the POI he is looking for has a name something in addition to "Cafe Luna", he wants to remove the POI name "Cafe Luna". Further, the user wants to remove the POI type "Coffee and Tea House" because the desired POI is a coffee dealer. Thus, in FIG. 30C, the user presses both the "Remove Name" key and the "Remove Type" key for the first POI name on the screen.

Figure 30D:
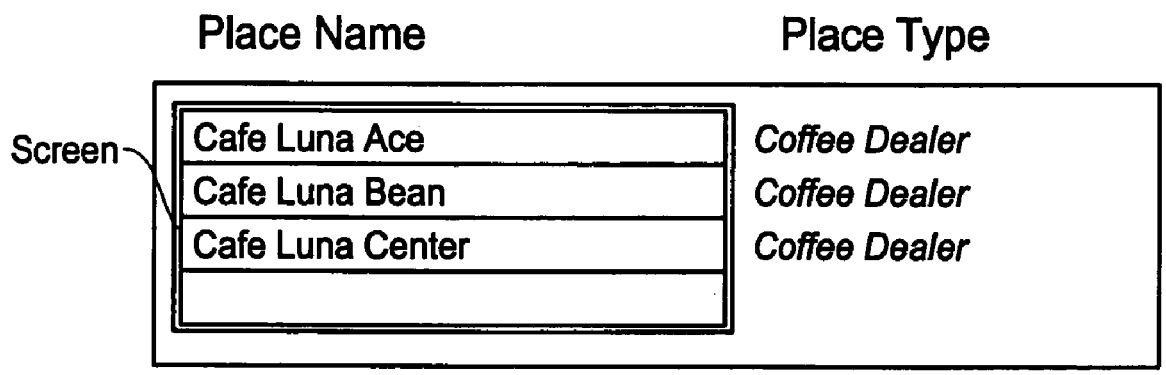

As a result, the navigation system removes the POI names "Cafe Luna" without regard to the POI type, and removes the POI types "Coffee and Tea House" without regard to the POI name. Thus, as shown in FIG. 30D, the navigation system removes 11 names from the screen, leaving only three POI names with the type "Coffee Dealer". The user can easily find the desired POI from the name list of FIG. 30D.

Figure 31A:
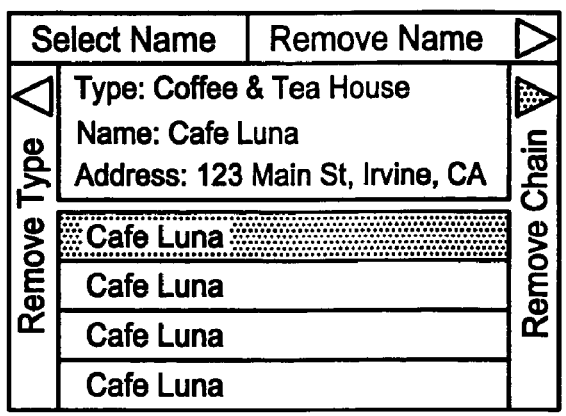
FIGS. 31A-31B are schematic diagrams showing an example of screen display for listing POI names and removing POIs by specifying a chain ID in the navigation system of the present invention.
Figure 31B:
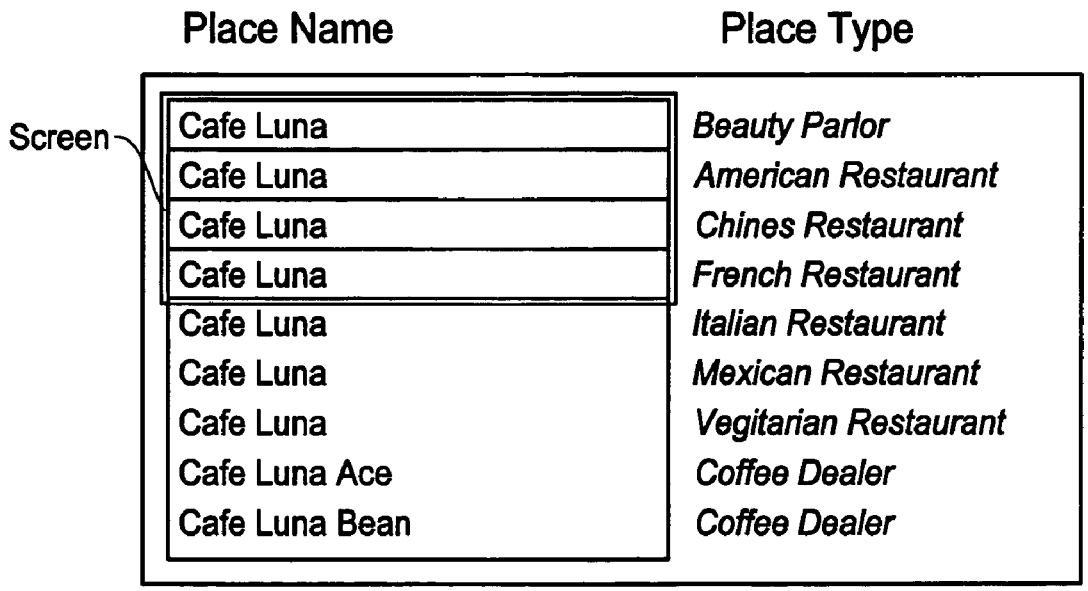

The POI removal shown in FIGS. 30C and 30D may be excessive to the user in the case where, for example, he is looking for a Mexican food restaurant by the name of "Cafe Luna". FIGS. 31A-31B show an example of listing POI names and removing POI names by specifying a chain ID in the navigation system of the present invention. In FIG. 31A, the user presses the "Remove Chain" key to remove the business chain of "Cafe Luna" which is in the coffee and tea house business.

As a result, the navigation system removes the business chain of "Cafe Luna" without regard to the actual business name. Accordingly, not only "Cafe Luna" of coffee and tea house, but also "Cafe Luna Palace" and "Cafe Luna Center" which are also within the business chain of "Cafe Luna" are removed. The user can easily find the desired POI from the name list of FIG. 31B.

As has been described above, according to the present invention, the navigation system enables the user to enter the destination easily and quickly through the "Point of Interest" input method by removing unwanted names or types from the POI name list. Because the user can determine unwanted POI names without defining a specific type after seeing the names on the full list, the user has a freedom to select a preferred name on the POI name list. The number of entries in the POI name list is reduced and thus simplified because the unwanted POI names are removed, as a result, the user can easily and quickly determine the destination on the name list.

Although the invention is described herein with reference to the preferred embodiments, one skilled in the art will readily appreciate that various modifications and variations may be made without departing from the spirit and the scope of the present invention. Such modifications and variations are considered to be within the purview and scope of the appended claims and their equivalents.

What is claimed is:

1. A display method for a navigation system for guiding a user to a destination, comprising the following steps of:

displaying a "Point of Interest (POI)" name list that shows candidate destinations to visit based on an instruction specified by a user;

displaying at least one function key for selecting a group of POIs;

selecting an unwanted POI name in the POI name list;

selecting the function key for specifying a group of POIs in the POI name list;

removing all POIs that coincide with both the selected unwanted POI name and the selected group of POIs from the POI name list; and selecting a destination in the POI name list from which the unwanted POI name has been removed for route guidance by the navigation system.

2. A display method as defined in claim 1, further comprising a step of repeating the step of selecting the unwanted POI name, the step of selecting the function key, and the step of removing the coincident POIs from the POI name list.

3. A display method as defined in claim 2, further comprising a step of determining an optimum route to the destination, thereby performing route guidance to the destination.

4. A display method as defined in claim 1, wherein said step of displaying the POI name list includes a step of determining a method of retrieving the POI names either by a place type or a place name.

5. A display method as defined in claim 1, wherein said step of displaying the POI name list includes a step of determining an order of listing the POI names either by distance from a current user position or by an alphabetical order.

6. A display method as defined in claim 1, wherein said step of removing the POIs includes a step of filling other POI names in spaces in the POI name list where the unwanted POI names have been removed.

7. A display method as defined in claim 1, wherein said step of removing the POIs includes a step of adding new POI names to the POI name list where the unwanted POI names have been removed, and wherein the unwanted POI names are removed from the new POI names before being added to the POI name list.

8. A display method for a navigation system for guiding a user to a destination, comprising the following steps of:

displaying a "Point of Interest (POI)" name list that shows candidate destinations to visit based on an instruction specified by a user;

displaying a first function key for specifying a name of POIs and a second function key for specifying a type of POIs;

selecting an unwanted POI name in the POI name list;

selecting either the first function key for removing POIs having the unwanted POI name or the second function key for removing POIs of same type as that of the unwanted POI name;

removing all POIs having the unwanted POI name from the POI name list when the first function key is selected and removing all POIs in the same type as that of the unwanted POI name when the second function key is selected; and selecting a destination in the POI name list from which the unwanted POI name has been removed for route guidance by the navigation system.

9. A display method as defined in claim 8, further comprising a step of repeating the step of selecting the unwanted POI name, the step of, selecting the first or second function key, and the step of removing the POIs that coincide with the selected unwanted POI name and the selected first or second function key from the POI name list.

10. A display method as defined in claim 9, further comprising a step of determining an optimum route to the destination, thereby performing route guidance to the destination.

11. A display method as defined in claim 8, wherein said step of displaying the POI name list includes a step of determining a method of retrieving the POI names either by a place type or a place name.

12. A display method as defined in claim 8, wherein said step of displaying the POI name list includes a step of determining an order of listing the POI names either by distance from a current user position or by an alphabetical order.

13. A display method as defined in claim 8, wherein said step of removing the POIs includes a step of filling other POI names in spaces in the POI name list where the unwanted POI names have been removed.

14. A display method as defined in claim 8, wherein said step of removing the POIs includes a step of adding new POI names to the POI name list where the unwanted POI names have been removed, and wherein the unwanted POI names are removed from the new POI names before being added to the POI name list.

15. A display apparatus for a navigation system for guiding a user to a destination, comprising:

means for displaying a "Point of Interest (POI)" name list that shows candidate destinations to visit based on an instruction specified by a user;

means for displaying at least one function key for selecting a group of POIs;

means for selecting an unwanted POI name in the POI name list;

means for executing the function key for selecting a group of POIs in the POI name list;

means for removing all POIs that coincide with both the selected unwanted POI name and the selected group of POIs from the POI name list; and means for selecting a destination in the POI name list from which the unwanted POI name has been removed for route guidance by the navigation system.

16. A display apparatus as defined in claim 15, further comprising means for repeating processes of selecting the unwanted POI name, selecting the function key, and removing the coincident POIs from the POI name list.

17. A display apparatus as defined in claim 16, further comprising means for determining an optimum route to the destination, thereby performing route guidance to the destination.

18. A display apparatus as defined in claim 15, wherein said means for displaying the POI name list includes means for determining a method of retrieving the POI names either by a place type of a place name.

19. A display apparatus as defined in claim 15, wherein said means for displaying the POI name list includes means for determining an order of listing the POI names either by distance from a current user position or by an alphabetical order.

20. A display apparatus as defined in claim 15, wherein said means for removing the POIs includes means for filling other POI names in spaces in the POI name list where the unwanted POI names have been removed.

21. A display apparatus as defined in claim 15, wherein said means for removing the POIs includes means for adding new POI names to the POI name list where the unwanted POI names have been removed, and wherein the unwanted POI names are removed from the new POI names before being added to the POI name list.

22. A display apparatus for a navigation system for guiding a user to a destination, comprising:

means for displaying a "Point of Interest (POI)" name list that shows candidate destinations to visit based on an instruction specified by a user;

means for displaying a first function key for specifying a name of POIs and a second function key for specifying a type of POIs;

means for selecting an unwanted POI name in the POI name list;

means for selecting either the first function key for removing POIs having the unwanted POI name or the second function key for removing POIs of same type as that of the unwanted POI name;

means for removing all POIs having the unwanted POI name from the POI name list when the first function key is selected and removing all POIs in the same type as that of the unwanted POI name when the second function key is selected; and means for selecting a destination in the POI name list from which the unwanted POI name has been removed for route guidance by the navigation system.

23. A display apparatus as defined in claim 22, further comprising means for repeating processes for selecting the unwanted POI name, selecting the first or second function key, and removing the POIs that coincide with the selecting unwanted POI name and the selecting first or second function key from the POI name list.

24. A display apparatus as defined in claim 23, further comprising means for determining an optimum route pg,37 to the destination, thereby performing route guidance to the destination.

25. A display apparatus as defined in claim 22, wherein said means for displaying the POI name list includes means for determining a method of retrieving the POI names either by a place type of a place name.

26. A display apparatus as defined in claim 22, wherein said means for displaying the POI name list includes means for determining an order of listing the POI names either by distance from a current user position or by an alphabetical order.

27. A display apparatus as defined in claim 22, wherein said means for removing the POIs includes means for filling other POI names in spaces in the POI name list where the unwanted POI names have been removed.

28. A display apparatus as defined in claim 22, wherein said means for removing the POIs includes means for adding new POI names to the POI name list where the unwanted POI names have been removed, and wherein the unwanted POI names are removed from the new POI names before being added to the POI name list.

* * * * *